United States Patent
Sterling et al.

[11] Patent Number: 6,087,430
[45] Date of Patent: Jul. 11, 2000

[54] THERMOPLASTIC POLYMERS WITH DISPERSED FLUOROCARBON ADDITIVES

[75] Inventors: Robert E. Sterling, Homosassa Springs, Fla.; Eugene P. Goldberg, Duluth, Ga.

[73] Assignee: RES Development Corporation, Lecanto, Fla.

[21] Appl. No.: 08/729,032

[22] Filed: Oct. 9, 1996

[51] Int. Cl.[7] .................................................. C08J 3/18
[52] U.S. Cl. ...................... 524/462; 524/463; 524/366; 524/376
[58] Field of Search ................... 524/462, 463, 524/366, 376

[56] References Cited

U.S. PATENT DOCUMENTS

| | | | |
|---|---|---|---|
| 5,210,123 | 5/1993 | Caporiccio | 524/463 |
| 5,508,330 | 4/1996 | Coughlin et al. | 524/462 |

FOREIGN PATENT DOCUMENTS

| | | | |
|---|---|---|---|
| 62-104161 | 6/1985 | Japan | 624/366 |
| 2140255 | 5/1990 | Japan | 524/366 |
| 9501396 | 1/1995 | WIPO | 524/462 |

OTHER PUBLICATIONS

Japanese Kokai Patent No. SHO 60–1985–104161 In–House Translation pp. 1–15, Jun. 1985.
Hawley's Condensed Chemical Dictionary Eleventh Edition Feb. 1991 Sax et al p. 675, Feb. 1991.
Polymer Handbook Third Edition—Brandrup et al pp. VI/231–237, 249, 244–248, 258, 1989.
Hackh's Chemical Dictionary May 27, 1981 p. 34.

*Primary Examiner*—David W. Wu
*Assistant Examiner*—Ling-Siu Choi
*Attorney, Agent, or Firm*—Miles & Stockbridge; Dennis P. Clarke

[57] ABSTRACT

A composition of matter formed by melt-blending certain thermoplastic polymers and from about 1.0 to about 7.5 wt. % of a fluorocarbon additive, the additive having a lower surface energy than that of the polymer; the blending resulting in a cooled admixture having a concentration of fluorocarbon additive through a cross-section of the solid composition lower in the interior thereof and higher at the surfaces thereof.

2 Claims, No Drawings

THERMOPLASTIC POLYMERS WITH DISPERSED FLUOROCARBON ADDITIVES

BACKGROUND OF THE INVENTION

1. Field of the Invention

The present invention relates to thermoplastic polymers modified with certain fluorocarbon additives.

2. Description of the Prior Art

It has recently been proposed to modify thermoplastic polymers by incorporating therein various oils, gums, etc.

U.S. Pat. No. 3,485,787 discloses that certain block copolymers may be extended by incorporating mineral oil therein.

U.S. Pat. No. 3,830,767 teaches that bleeding of the extending oil from the block copolymer may be prevented by incorporating a petroleum hydrocarbon wax therein.

U.S. Pat. No. 4,123,409 relates to block copolymers having thermoplastic terminal blocks and an elastomeric intermediate block. The patent discloses blending with the copolymer a high molecular weight oil which is compatible with the elastomeric block portion of the copolymer. Where the elastomeric portion is a hydrocarbon, the oil employed is a mineral oil. Where the elastomeric block is a polysiloxane, a silicone oil is blended therewith.

U.S. Pat. No. 3,034,509 discloses the addition of silicone oil to polyethylene for use as surgical tubing.

U.S. Pat. No. 4,386,179 discloses the dispersion of a polysiloxane throughout an elastomeric thermoplastic hydrocarbon block copolymer.

Japanese Patent No. 60-104,161 describes an anti-friction composite material comprising certain resins and more than 1% by weight of a fluorocarbon oil which have been injected molded together in a manner such that the oil exudes onto the molded surfaces of the resin due to poor compatibility of the oil with the resin and differences in viscosity between the resin and oil to produce an anti-friction surface.

European Patent Application No. 222,201 published May 20, 1987, discloses the use of certain perfluoropolyethers as additives in rubber blends vulcanizable with peroxides.

U.S. Pat. Nos. 5,143,963 and 5,128,773 disclose compositions of matter formed by melt-blending a thermoplastic polymer and from 0.01% to <1% of a fluorocarbon additive.

There is continuing research leading to the development of novel polymeric materials, the properties of which are tailored by incorporating therein various additives.

It is an object of the present invention to provide novel thermoplastic polymer compositions having unique properties and which find utility in a wide variety of applications.

It is another object of the invention to provide a novel method for preparing thermoplastic polymer compositions having properties and characteristics heretofore unattainable.

SUMMARY OF THE INVENTION

These and other objects are realized by the present invention which provides compositions of matter formed by melt-blending certain thermoplastic polymers and from about 1.0% to about 7.5% by weight of a fluorocarbon additive selected from the group consisting of a fluorocarbon oil, a fluorocarbon gum, a fluorocarbon grease and mixtures thereof, the fluorocarbon additive having a lower surface energy than that of the polymer and the melt-blending resulting in an initially substantially homogeneous admixture of the polymer and the fluorocarbon additive. The admixture, upon cooling, results in a solid composition wherein the concentration of fluorocarbon additive becomes lower in the bulk polymer and higher at the surfaces thereof, i.e., is a gradient through a cross-section of the solid composition from a lower value in the interior or bulk thereof to a higher value at the surfaces thereof.

Another embodiment of the invention comprises a method of forming compositions of matter comprising certain thermoplastic polymers and from about 1.0% to about 7.5% by weight of a fluorocarbon additive selected from the group consisting of a fluorocarbon oil, a fluorocarbon gum and mixtures thereof, the fluorocarbon additive having a lower surface energy than that of the polymer. The method comprises melt-blending, preferably in an efficient compounding blender, the polymer and the fluorocarbon additive at a temperature above the glass transition temperature or softening point of the polymer, but below that having a deleterious effect on the polymer and the fluorocarbon additive and for a time sufficient to initially produce a substantially homogeneous admixture of polymer and fluorocarbon additive, followed by cooling the admixture to produce a solid composition wherein the concentration of fluorocarbon additive through a cross-section of solid composition becomes lower in the polymer bulk thereof and higher at the surfaces thereof, i.e., is a gradient through a cross-section of the solid composition from a lower value in the interior or bulk thereof to a higher value at the surfaces thereof.

DETAILED DESCRIPTION OF THE INVENTION

Although most non-fluorinated polymers are not compatible with fluorocarbon oils and gums and are also not readily blended therewith because of the high specific gravity of the fluorocarbons, the present invention is predicated on the discovery that certain thermoplastic polymers, when efficiently melt-blended with from about 1.0% to about 7.5% by weight of a fluorocarbon oil, gum or mixture thereof such that the fluorocarbon additive is homogeneously distributed throughout the melt, yield, upon cooling, solid compositions which, because of the differences in thermodynamic compatibility and surface energy between the fluorocarbon additive and the polymer, develop higher concentrations of the additive at the surface than throughout the interior thereof.

In the phrase "concentration of fluorocarbon additive in a gradient through a cross-section from a lower value at the center thereof to a higher value at the surfaces," the term "gradient" is not intended to suggest that the concentration varies uniformly from the center of the composition to the surface. Although this may be the case with respect to some combination of polymers and additive, typically a much higher concentration of the additive is at the surfaces of the composition with a much smaller amount in the interior or bulk of the polymer.

This higher concentration of fluorocarbon additive at the surface of the polymer enables the provision of a polymer composition having heretofore unattainable properties. Thus, using very low concentrations of fluorocarbon additive, i.e., from about 1.0% to about 7.5% by weight, relatively high concentrations are attainable at the surface.

The high concentrations of fluorocarbon additive at the surfaces provide compositions having the advantages of fluorocarbon-like surface properties, i.e., greater hydrophobicity, lower surface energy, non-adherent surface characteristics, more chemically inert, lower friction, smoother, etc. In addition, the presence of the fluorocarbon additive enhances molding operations since it reduces "sticking" of the composition to the mold surfaces and enhances mold release. Also, the additive will, because of the lubricant properties thereof, permit higher speed processing of extruded objects, i.e., films, fibers and other objects formed therefrom and with smoother surfaces, with the added benefits of shorter injection molding cycles and higher extrusion rates.

For biological or biomedical applications of the polymer compositions, the fluorocarbon surfaces are especially advantageous since they exhibit superior biocompatibility in contact with tissue surfaces, cells, physiological fluids and blood as compared with most thermoplastic polymers.

The compositions of this invention are, therefore, particularly advantageous for such applications as blood and fluid handling, medical tubing, vascular grafts, mammary implants, orthopedic joint and tendon prostheses, ocular implants, and the like.

Fibers prepared from compositions of the invention possess superior surface smoothness and uniformity and handling properties for weaving, as well as different textures and "feel" because of the surface properties imparted by the fluorocarbon additives. In addition, the compositions and methods of the invention are advantageous and more economical in the manufacture of fibers since the higher concentration of fluorocarbon additive at the surfaces of the fiber facilitates high-speed processing with less damage to dies, shuttles and weaving equipment to produce more uniform, smooth, melt-spun fibers.

For the most part, the basic bulk mechanical, physical and chemical properties of the thermoplastic polymer employed are retained or even enhanced for the compositions of the present invention, but acquire the fluorocarbon surface properties of the additive due to the above-noted gradient concentration of the fluorocarbon additive through a cross-section of the composition from a lower value in the bulk to a higher value at the surface. This makes the compositions of this invention also advantageous for molds such as those used for optical and electronic parts, i.e., contact lenses, and for electro-optical or electromechanical devices which require lower surface energy and low friction surfaces, i.e., video tapes, compact discs for audio or video recording, electro-mechanical switches, and the like.

The lower concentrations of fluorocarbon additive in the interior portion of the thermoplastic can also advantageously modify the bulk mechanical, physical and chemical properties of the polymer, however, particularly with respect to the classes of thermoplastic polymers discussed hereinbelow.

A unique advantage associated with the compositions of the invention is that if cut into plural sections, the fluorocarbon additive in the interior will migrate to the new surfaces formed by the cutting operation.

A wide variety of polymers may be utilized in the practice of the invention. Preferred among the suitable polymers are:

Polyolefins such as polyethylene, polypropylene, polybutylene, etc., are advantageously and preferably employed in the practice of the invention because fluorocarbon surface properties are achieved at very low overall fluorocarbon additive concentrations. For example, using only 2.0 wt. % of a 450 centistoke viscosity perfluoropolypropylene oxide fluorocarbon oil in high density polyethylene, a surface composition of 47 atomic % fluorine is achieved as shown by XPS (X-ray Photoelectron Spectroscopy) analysis. This surface is characterized by an increase in hydrophobicity for the fluorocarbon modified composition and a decrease in surface energy, indicative of the significantly altered surface properties achieved using only 2.0 wt. % of fluorocarbon additive. Improvement in mechanical properties and greater ductility are also achieved using the fluorocarbon additive. The energy required for extrusion (torque) is also reduced.

Olefin copolymers and block copolymers such as ethylene-propylene, and styrene-olefin block copolymers such as styrene-butadiene, styrene-butadiene-styrene, and styrene-ethylene/butylene-styrene and styrene graft copolymers such as styrene-butadiene-acrylonitrile (ABS) are another class of preferred polymers for the practice of the invention. For example, the modification of a styrene-ethylene/butylene-styrene block copolymer results in improved mechanical properties. ABS graft polymers (i.e., Cycolac™) and ethylene-propylene copolymers are also readily modified to improve surface properties.

Other vinyl polymers also exhibit enhanced properties and fluorocarbon surfaces using the additives of this invention. Such polymers include acrylic and methacrylic polymers, i.e., polymethylmethacrylate, polymethylacrylate, polybutylmethacrylate, etc.; polyacrylonitrile; polyvinyl chloride (rigid and plasticized flexible compositions); and various aromatic vinyl polymers, i.e., polystyrene.

Various polyurethanes are also advantageously modified by this invention.

It is preferred to employ fluorocarbon additives having a surface energy substantially lower than that of the polymer with which it is compounded in order to ensure the high surface fluorine concentration described above.

Suitable fluorocarbon oils, gums and greases include fluorinated hydrocarbons and fluorinated hydrocarbon-polyether oils, i.e., Aflunox™ and Krytox™ oils and greases, including such oils, gums and greases as perfluoropolyethylene oxide, perfluoropolypropylene oxide, polytetrafluoroethylene oligomers, perfluoropolyethylene-propylene, perfluoropolybutadiene oligomers, polyvinylidene fluoride oligomers and their copolymers, and perfluorohydrocarbon oils such as perfluorocyclohexane, perfluorohexane, perfluorododecane and higher molecular weight homologous linear or branched perfluorohydrocarbons, and perfluorinated cyclic hydrocarbons.

The preferred fluorocarbon oils, gums and greases of this invention are characterized by having viscosities in the range of 20 to more than 50,000 centistokes at 20° C., and the preferred fluorocarbon greases useful in this invention are characterized by having consistencies (as determined by ASTM D-217) in the range of NLGI grades 0–6. Preferred greases include those made by mixing or blending fluoropolyether oils with perfluorohydrocarbons, such as those preferred from mixtures of Krytox™ fluoroether oils with Vydax™ fluorotelomers.

The selection of a particular oil, gum or grease will depend, of course, on the intended applications of the resultant composition.

Generally, it is preferred that the fluorocarbon additive have a lower surface energy, by more than about 5 dynes/cm, as compared with the polymer with which it is compounded.

It is a particularly advantageous feature of the present invention that extremely small amounts of fluorocarbon additive may be incorporated in the thermoplastic polymer to achieve the highly unusual and desirable properties associated with the compositions of the invention.

By ensuring that the melt-blending step results in an initially homogeneous admixture of the ingredients, one is able to obtain, upon cooling the melt, a solid composition having the above-described gradient concentration. If the ingredients are not homogeneously melt-blended, the product will comprise a composition wherein a substantial amount of unmixed free fluorocarbon additive simply coats the surface of the polymer. Because of the incompatibility of the F-additive and the difference in surface energies between the polymers and the fluorocarbon additive, the latter will not readily diffuse into and penetrate the polymer to any appreciable extent. Relatively uniform dispersion of the additive throughout the polymer during preparation requires homogeneous blending in the melted state. This is not readily achievable by the mixing normally obtainable by simple RAM-type injection-molding or single-screw extrusion. Attempts to mold or extrude thermoplastics blended with small amounts of fluorocarbon oil additive in injection-molding machines or single-screw extruders which fail to afford efficient shear mixing in the melt can result in substantial melt inhomogeneity and extruder screw slippage in the melt with consequent erratic flow, making it impractical to form the polymer by simple molding or extrusion without first using the efficient high shear compounding blending methods of the invention.

Any suitable temperature which is below the decomposition temperature of either the polymer or additive, but above the softening point of the polymer, and which ensures homogeneous admixing of the ingredients may be employed in the practice of the invention.

To facilitate admixing of the fluorocarbon additive with the polymer, it is preferred to employ small particle sizes (e.g., pellets or powders) of the polymer. This ensures efficient wetting of the polymer particle surface prior to melt-blending, thereby ensuring efficient dispersion of the additive throughout the polymer.

In the most preferred embodiments, the fluorocarbon additive is premixed with a fraction of pelletized polymer and the thus wetted fraction or premix is then admixed with the remainder of the polymer and subsequently melt-blended in an efficient high shear compounding extruder such as a twin-screw compounding extruder-blender. Alternatively, master-batch methods may be advantageously used in which high shear melt blended compositions containing higher concentrations of fluorocarbon are admixed with virgin polymer for extrusion or molding.

A major improvement in melt processing for homogeneously blended compositions of this invention is achieved by the incorporation of 1.0 to 7.5 wt. % of the fluorocarbon additive. In addition to smoother surface finish and more uniform melt flow which is critically important for forming precision parts, fibers and films, less torque or pressure is required for many compositions as compared to the normal thermoplastic polymer.

The following illustrates the need for highly efficient compounding blending for homogeneous mixing to achieve the compositions of this invention and the inability to obtain such good mixing of the fluorocarbon additives of this invention in conventional screw-ram injection molding or normal screw extruders which are not designed for high shear compounding.

Pellets of an S-E/B-S thermoplastic (styrene-olefin block copolymer, Shell Kraton G) were added to the hopper of a screw-type injection molding machine of the latest design and equipped with open loop electronic controllers for controlling injection rotation speeds, speed change-over positions, screw rotation speeds, metering, decompression, etc., A mold for a 4.00×4.00×0.25 inch part was used and conditions were set and tested to ensure good molding of the part with the base polymer. The base polymer was then purged from the hopper and hopper screw. Base polymer was tumble-mixed with 0.5 wt. % fluorocarbon oil (perfluoropolypropylene oxide, viscosity 450 centistokes at 20° C.) to ensure uniform coating of the pellets which were then carefully introduced into the injection-molding machine screw for molding under conditions used for the base polymer. It was found, however, that the polymer containing even as little as 0.5 wt. % additive would not feed adequately for molding. Satisfactory molding could not be achieved despite testing a number of variations in screw speeds and other molding conditions. A similar result, inability to properly feed and mold the base polymer with additive, was observed using only 0.25 wt. % additive. A major problem was the slippage of material around the screw flights which resulted in pressure through the screw which was inadequate to move the melt through the nozzle for satisfactory injection-molding. From this experiment, it is clear that homogeneous blending is essential for preparing compounds which can be injection-molded or extruded to yield uniform parts, especially for the compositions of this invention which contain more than 1.0 wt. % fluorocarbon additive. High shear compounding-blending, such as that achieved in a twin-screw compounding extruder of screw-flight design for efficient high shear melt mixing, achieves such good blending for the preparation of the compositions of this invention.

The invention is illustrated by the following non-limiting examples in which all percentages are by weight except as otherwise indicated.

EXAMPLE 1

Polymethylmethacrylate (PMMA) pellets were tumble-coated with 1.0% perfluoropolypropylene oxide fluid (450 cps) and extruded using a higher shear twin-screw compounding extruder. The resulting extruded film surface was shown to have 39.6 atomic % fluorine by XPS analysis although the bulk composition contains only 1% additive. Various surface properties are thereby improved (i.e., lower friction and lower surface energy).

EXAMPLE 2

As described in Example 1, high density polyethylene was compounded with 2.0% fluorocarbon additive to yield films having 47.4 atomic % fluorine at the surface by XPS analysis with a corresponding improvement in surface properties.

EXAMPLE 3

As described in Example 1, polypropylene was compounded with 2.0% fluorocarbon additive to yield films having 41.3 atomic % fluorine at the surface by XPS analysis with a corresponding improvement in surface properties.

EXAMPLE 4

A plasticized polyvinyl chloride is compounded and extruded as described in Example 1 using 4.0% fluorocarbon additive. Resulting extruded films and molded pieces exhibit surface concentrations of greater than 20 atomic % fluorine by XPS analysis and have reduced surface friction. Using 6.0% F-additive, higher atomic % fluorine is achieved.

EXAMPLE 5

Polyurethane is compounded and extruded as described in Example 1 using 3.0% fluorocarbon additive. Resulting extruded films and molded pieces exhibit surface concentrations greater than 20 atomic % fluorine by XPS analysis and exhibit reduced surface friction. Further improved surface properties are achieved using 5.0% F-additive.

What is claimed is:

1. A method of forming a composition of matter comprising a thermoplastic polymer and from about 1.0 to about 7.5% by weight of a perfluorinated hydrocarbon polyether additive selected from the group consisting of an oil, gum, grease and mixtures thereof, said additive having a lower surface energy than that of said polymer, said method comprising melt-blending said polymer and said additive at a temperature for a time sufficient to produce a homogeneous admixture of said polymer and said additive, followed by cooling said admixture to produce a solid composition wherein the concentration of said additive through a cross-section of said solid composition is lower in the interior thereof and higher at the surfaces thereof.

2. A method according to claim 1 including the preliminary step of forming a premix comprising a fractional portion of said thermoplastic polymer in particulate form uniformly wetted with a fluorocarbon additive and mixing said wetted first fraction or previously compounded masterbatch with the remainder of said thermoplastic polymer.

* * * * *